June 1, 1965  G. ALFIERI  3,186,771
DEVICE FOR PROPORTIONATING THE PNEUMATIC BRAKING OF MOTOR
VEHICLES TO THE LOAD TRANSPORTED BY THE VEHICLE
Filed April 22, 1963
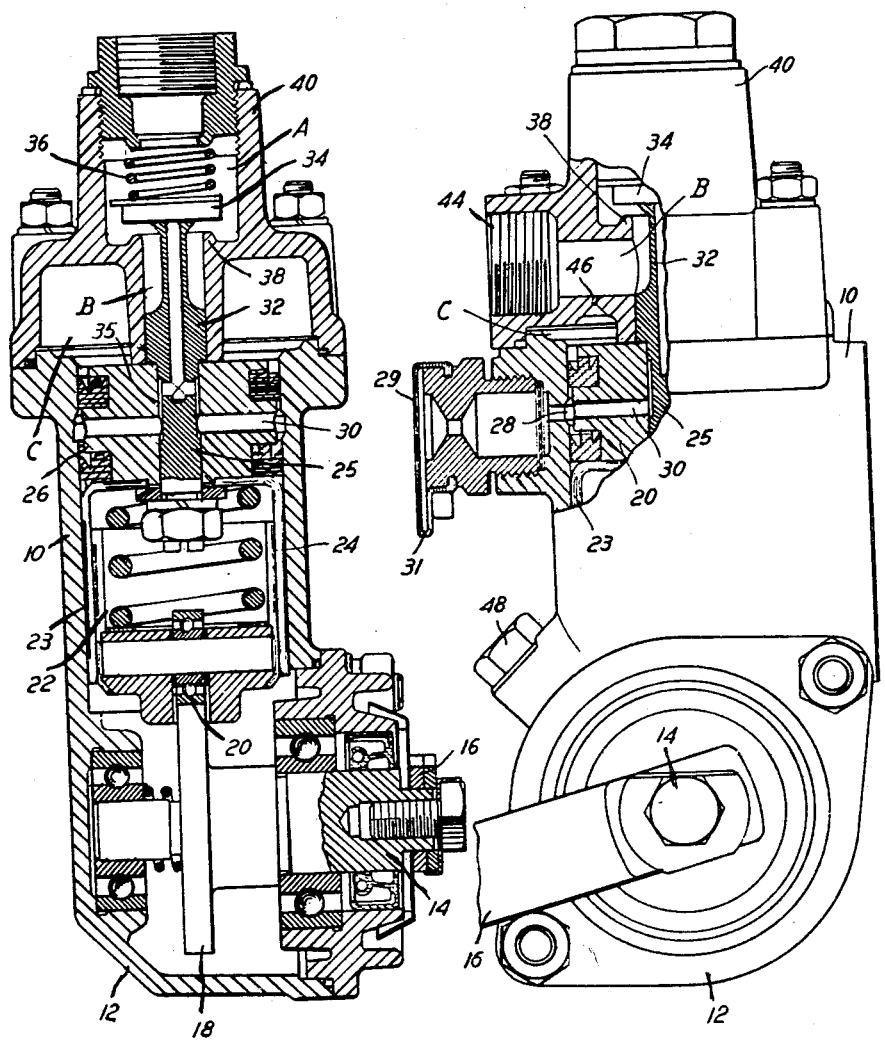
INVENTOR.
Giuseppe Alfieri
BY
Stevens, Davis, Miller & Mosher
Attorneys

United States Patent Office 3,186,771
Patented June 1, 1965

3,186,771
DEVICE FOR PROPORTIONATING THE PNEUMATIC BRAKING OF MOTOR VEHICLES TO THE LOAD TRANSPORTED BY THE VEHICLE
Giuseppe Alfieri, Milan, Italy, assignor to Fabbrica Italiana Magneti Marelli S.p.A., Milan, Italy, a corporation of Italy
Filed Apr. 22, 1963, Ser. No. 274,759
Claims priority, application Italy, Apr. 30, 1962, 8,587/62
5 Claims. (Cl. 303—22)

The present invention relates to a device to be applied in the pneumatic system of the brakes of motor vehicles, in order to control and proportionate the braking pressure relative to the load transported by the vehicle, and this in order to prevent the braking action from exceeding the gripping force of the wheels on the road and consequently from causing the locking of the wheels.

The known devices employed for this purpose present inconveniences which make inefficient and precarious the operation and effectiveness of the braking of the vehicle. By way of example, during the running of the vehicle, particularly on an uneven road, the frame of the vehicle is submitted to oscillations, which continuously change the reciprocal distance between the axles and the frame. These oscillations, during the braking, cause disturbing actions which, in turn, cause considerable inconveniences, as, under certain circumstances, the braking conduit, during the setting up of the pressure, can be connected, also for a moment, with the discharge. Furthermore, in the case of the hauling of vehicles, unbalancing of braking takes place in relation to the drive vehicle when the loads of the drive and the driven vehicles are considerably different.

This invention has the object of eliminating these inconveniences and of making the braking safer and more proportioned, especially when the vehicle runs on an uneven road. Furthermore, it is possible to proportion air pressure in the desired manner, and in correspondence to the variation of the load.

The device according to this invention comprises a cylinder-piston unit, sensitive to the braking pressure, whose movable part is actuated, through the interposition of elastic means, by the relative displacement between the frame and the axle of the vehicle, in order to actuate an interception valve inserted in the duct feeding the pneumatic elements for actuating the brakes, and in order to regulate the pressure of the air in correspondence with load variation, at least one calibrated opening disposed between the pneumatic chamber of said cylinder-piston unit and the duct which feeds said actuating members, so that the oscillations transmitted to the vehicle during the running of the same are counteracted or limited.

In order to be able to proportion, with the desired standard, the braking action in correspondence with the variation of the load, in the kinematic linkage which connects the movable part of the vehicle with the part relatively stationary of the same, an appropriate means is inserted to act on the elastic means which contrast the displacement of the movable part of said cylinder-piston unit.

The invention, showing a preferred embodiment of the device, will now be explained with the following description, with reference to the enclosed drawing, given only by way of exemplification. In the drawing:

FIG. 1 shows a lateral view, with partial sections, of the device according to the invention;

FIG. 2 is the vertical sectional view of such device.

With reference to such figures, a cylinder 10 ends in the lower portion with a cup 12, crossed by a shaft 14 which is solidly connected with a lever 16 leading to the movable part of the vehicle, by way of example, to the axle, in case the device is fastened to the frame of the vehicle. Obviously, the connection of lever 16 with said axle is effected through appropriate means, as connecting rods or the like. On the shaft 14 and inside the cup 12, is keyed on a cam 18, with the desired profile, with the periphery of which cooperates a roller bearing 20 fitted on the bottom of a cap 22, which, in turn, slides inside the cylinder 10. The cap 22 holds one of the ends of a spring 24, whose other ends cooperate with the bottom of the counter-cap 23, which connects solidly, by means of a threaded pin 25, with the piston 26 which slides tightly in said cylinder 10.

Such cylinder foresees, in an appropriate position, a discharge opening 28 leading to the atmosphere, through an elastic cover 29 which ends with a sheared appendage 31 constituting a valve. Piston 26 is provided with radial holes 30 which communicate with the atmosphere through an annular groove leading to the hole 28. In the upper portion, piston 26 is provided with a bored push rod 32 constituted by the free end of the rod 25 adapted to cooperate with the lower face of an interception valve 34 influenced by a spring 36, whose action is to engage same valve against the relative seat 38.

The bore of the push rod 32 connects, through a gap 35, defined between the exterior face of such push rod and the interior of the hole of the piston 26, with radial holes 30.

The interception valve 34 is disposed in a chamber A which is in communication, through a pipe fitting 40, with the distributor of the braking system. A second chamber B is defined below seat 38 and the enclosure wall 42 of the cylinder 10 above considered. This chamber connects, through a pipe fitting 44, with the pneumatic actuating members of the brakes (not shown).

Piston 26 defines, in correspondence with the upper portion, a pneumatic chamber C which is in communication with chamber B, through one or several calibrated holes 46 (FIGURE 1).

The cup 12, foreseen in correspondence with the lower part of the cylinder 10, is provided, in appropriate position, with a plug 48, adapted to permit the filling of said cup with lubricating oil and the sealing of the different parts of the device and the level of such oil is controlled through the opening closed by said plug.

The profile of cam 18 is designed in an appropriate manner in order to obtain the desired braking action as the load varies. By way of example, when the vehicle is loaded lightly, the braking action can be reduced by a certain amount relative to the braking action obtained when the vehicle is at full load.

Operation of the device is therefore evident. The variations of the loads of the vehicle cause oscillation of cam 18, so that such cam, by means of cap 22, presses more or less the spring 24 so as to develop a variable contrasing action when piston 26 moves under the action of the pneumatic pressure. Consequently, when the air pressure in chamber A exceeds the magnitude of what is necessary to have in the chamber B, valve 34 closes and in the ducts B connected with the operating members, the desired pressure is not exceeded. During the braking action, air coming from the distributor enters the chamber A and, through the opening provided by the valve 34 and by the relative seat 38, passes into the chamber B and from this chamber, through the pipe-fittings 44, to the brake actuating members. The pressurized air existing in chamber B passes also into chamber C, through the calibrated hole 46, and acts thus on piston 26 in opposition to the action of the spring 24. If the pressure which establishes in chamber C develops an action stronger than that exerted by the spring 24 in the considered moment, piston 26 displaces downward, causing the closing of the communication between chambers A and B, thus limiting and intercepting each further passage of air toward the brake actuating members. In such case, the pressure of air in the actuating members, i.e. in chamber B, cannot exceed the action developed by the spring 24 and consequently by the load which lies on the axle controlled by the device. When the braking action finishes, valve 34 is opened and air is discharged, in the known manner, through the distributor of the braking system, so that piston 26 goes back in the original rest position, where the push rod 32 holds valve 34 away from relative seat 38.

During the running of the vehicle, the frame of the latter effects oscillations which change periodically the distance between said frame and the axle. These changes influence spring 24 and therefore piston 26. According to the present invention, however, such piston does not feel these oscillations, as the latter are opposed, in a certain measure, by the air cushion which forms in chamber C and whose discharge in the overhanging chamber B is opposed and delayed by the calibrated opening 46, so that said chamber C constitutes a chamber in which is stabilized the pressure acting on piston 26.

When in chamber C considerable overpressures develop, caused, by way of example, by oscillations of considerable magnitude of the frame, such overpressures are immediately discharged by the disengagement of the edge of the push rod 32 from the lower surface of valve 34, so that chamber B is put, for a short period, in communication with the discharge so as to discharge the overpressure and re-establish in chamber B, and consequently in chamber C, the necessary pressure.

It is evident that the provision of an oil supply in the cup 12 permits, in addition to the lubrication, also the sealing of the moving parts of the device and the latter can be mounted easily and quickly on every type of vehicle.

The length of a lever 16 can be conveniently adjusted in order to adapt the device to the characteristics of the suspension of the axle under consideration. Obviously, the displacements of such lever can vary in any way without damaging the device.

In effect, details of embodiment of the device can vary without departing from the limits of the invention and from the domain of the patent.

I claim:

1. A device for proportioning the pressure required in a pneumatic system of braking vehicles automatically in accordance with the load comprising a slidable piston sealably mounted in a cylinder mounted on a vehicle frame, resilient means for moving said piston in response to the relative movement between the frame and an axle, an interception valve assembly actuated by said piston and positioned in the duct in said cylinder through which the air passes to the braking system, an air chamber defined by the upper surface of said piston and the lower wall of said duct and at least one calibrated opening connecting said chamber and said duct to equalize the pressure in said duct and said chamber during the oscillation of said piston caused by the relative movement between said axle and said frame.

2. A device for proportioning the pressure required in a pneumatic system of braking vehicles automatically in accordance with the load comprising a slidable piston sealably mounted in a cylinder mounted on a vehicle frame, resilient means for moving said piston in response to the relative movement between the frame and an axle an L-shaped duct positioned in the upper part of said cylinder through which the air enters and leaves said cylinder as it passes to the braking system, an interception valve assembly actuated by said piston and positioned in the said duct, an air chamber defined by the upper surface of said piston and the lower wall of said duct and at least one calibrated opening connecting said chamber and said duct to equalize the pressure in said duct and said chamber during the oscillation of said piston caused by the relative movement between said axle and said frame and an overpressure discharge opening in said cylinder wall connected to said chamber by said duct and passageways in said valve assembly and said piston.

3. A device for proportioning the pressure required in a pneumatic system of braking vehicles automatically in accordance with the load comprising a slidable piston sealably mounted in a cylinder mounted on a vehicle frame, an L-shaped duct in said cylinder above said piston for the passage of air through said cylinder to the braking elements, an intercepter valve assembly positioned in the upper part of said duct to form an incoming air pressure chamber and connected to said piston, resilient biased means for positioning said piston in said cylinder in response to the relative movement between said vehicle and said axle, means linking said resilient means and said axle, an air chamber defined by the upper surface of said piston and the said duct and at least one calibrated opening connecting said chamber and said duct to equalize the pressure in said duct and said chamber during the oscillation of said piston caused by the relative movement between said axle and said frame and an overpressure discharge opening in said cylinder wall connected to said chamber by said duct and passageways in said valve assembly and said piston.

4. A device for proportioning the pressure required in a pneumatic system of braking vehicles automatically in accordance with the load comprising a slidable piston sealably mounted in a cylinder mounted on a vehicle frame, an L-shaped duct in said cylinder above said piston for the passage of air through said cylinder to the braking elements, an incoming pressure chamber forming the upper part of said duct, a valve seat around an opening in the bottom of said chamber leading into said duct, a valve within said chamber resiliently biased into sealable contact with said seat, a rod connected at its lower end to said piston and passing upwardly therefrom through said duct into said opening to push against the under surface of said valve to unseal same from said seat, the upper part of said rod being of lesser diameter than said duct to form a second incoming air chamber as the central portion of said duct interconnecting said first incoming air chamber and the outlet portion of said duct, a third air chamber defined by the upper surface of said piston and the wall of said outlet portion of said duct, resiliently biased means for positioning said piston in said cylinder in response to said relative movement between said frame and said axle, camming means positioned in the lower end of said cylinder for actuating said resiliently biased means, said camming means having a peripheral profile in accordance with the braking action required by the variance of the load, a rotatable shaft bearing said camming means on one end and connected at the opposite end by a lever pivotally attached to the axle, at least one calibrated opening connecting said chamber and said duct to equalize the pressure in said duct and said chamber during the oscillation of said piston caused by the relative movement between said axle and said frame and an overpressure discharge opening in said cylinder wall connected to said chamber by said duct and passageways in said valve assembly and said piston.

5. A device for proportioning the pressure required in a pneumatic system of braking vehicles automatically in accordance with the load comprising a slidable piston sealably mounted in a cylinder mounted on a vehicle frame, an L-shaped duct in said cylinder above said piston for the passage of air through said cylinder to the braking elements, an incoming pressure chamber forming the upper part of said duct, a valve seat around an opening in the bottom of said chamber leading into said duct, a valve within said chamber resiliently biased into sealable contact with said seat, a rod connected at its lower end to said piston and passing upwardly therefrom through said duct into said opening to push against the under surface of said valve to unseal same from said seat, the upper part of said rod being of lesser diameter than said duct to form a second incoming air chamber as the central portion of said duct interconnecting said first incoming air chamber and the outlet portion of said duct, said upper portion of said rod having an internal bore extending axially from the upper end substantially half its length and radial bores intersecting said axial bore at its interior terminus, a third air chamber defined by the upper surface of said piston and the wall of said outlet portion of said duct, resiliently biased means for positioning said piston in said cylinder in response to said relative movement between said frame and said axle, camming means positioned in the lower end of said cylinder for actuating said resiliently biased means, said camming means having a peripheral profile in accordance with the braking action required by the variance of the load, a rotatable shaft bearing said camming means on one end and connected at the opposite end by a lever pivotally attached to the axle, at least one calibrated opening connecting said chamber and said duct to equalize the pressure in said duct and said chamber during the oscillation of said piston caused by the relative movement between said axle and said frame and an overpressure discharge opening in said cylinder wall, radial passages in said piston leading from the periphery of the piston to a central bore in said piston through which bore said rod extends upwardly to said valve, said portion of said rod within said bore having a portion thereof of lesser diameter than said bore to form an axial passage along said portion interconnecting said piston radial passage with said radial bores of said rod, said discharge opening being connectable to said air chamber.

References Cited by the Examiner
UNITED STATES PATENTS

| 2,411,406 | 11/46 | Affleck. |
| 2,986,427 | 5/61 | McClure et al. _____ 303—22 |
| 3,018,136 | 1/62 | Williams _____ 303—6 |

FOREIGN PATENTS

| 386,333 | 1/33 | Great Britain. |
| 719,810 | 3/42 | Germany. |
| 854,104 | 11/60 | Great Britain. |

ARTHUR L. LA POINT, *Primary Examiner.*
EUGENE G. BOTZ, *Examiner.*